March 3, 1964   R. B. SPOONER   3,123,712
APPARATUS FOR MEASURING THE HEIGHT AND CONTOUR OF MATERIAL
Filed Nov. 14, 1961   4 Sheets-Sheet 1

INVENTOR.
ROBERT B. SPOONER.
BY Ronald S. Cornell
his ATTORNEY.

March 3, 1964  R. B. SPOONER  3,123,712
APPARATUS FOR MEASURING THE HEIGHT AND CONTOUR OF MATERIAL
Filed Nov. 14, 1961  4 Sheets-Sheet 2

INVENTOR.
ROBERT B. SPOONER.
BY
Ronald S. Cornell
his
ATTORNEY.

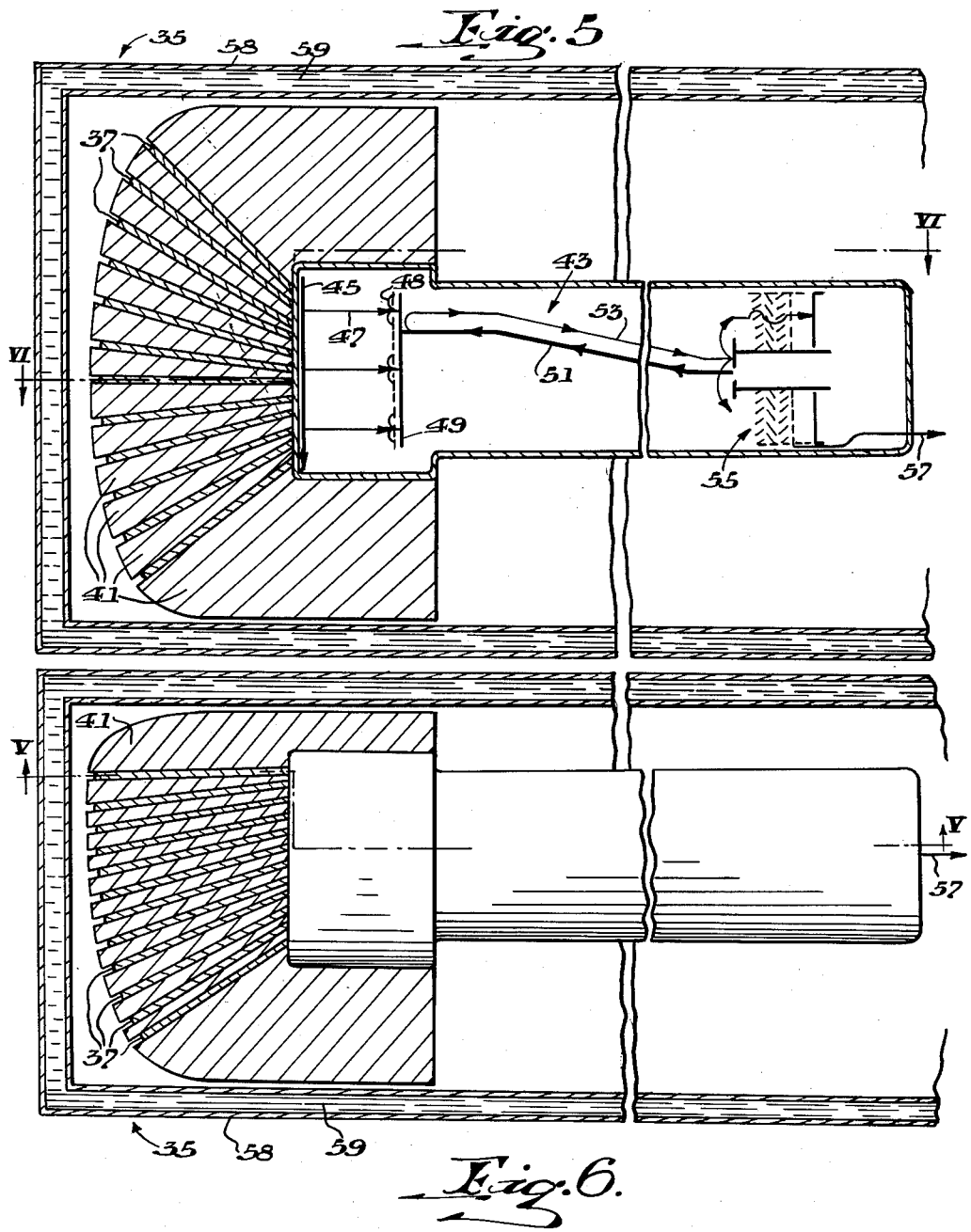

March 3, 1964  R. B. SPOONER  3,123,712
APPARATUS FOR MEASURING THE HEIGHT AND CONTOUR OF MATERIAL
Filed Nov. 14, 1961  4 Sheets-Sheet 4

INVENTOR.
ROBERT B. SPOONER.
BY
Ronald S. Cornell.
his
ATTORNEY

United States Patent Office 3,123,712
Patented Mar. 3, 1964

3,123,712
APPARATUS FOR MEASURING THE HEIGHT AND CONTOUR OF MATERIAL
Robert B. Spooner, Pittsburgh, Pa., assignor to Koppers Company, Inc., a corporation of Delaware
Filed Nov. 14, 1961, Ser. No. 152,201
2 Claims. (Cl. 250—71.5)

This invention relates to an improved apparatus for determining the height and contour of a surface, and is a continuation-in-part of my prior application Serial No. 861,019, now U.S. Patent No. 3,099,744, issued July 30, 1963.

My copending application Serial No. 861,019 discloses a system for using radiation to determine the contour and height of the surface. This invention is an improvement over my former application in that the apparatus is simplified and the number of moving parts reduced. The instant invention provides an apparatus for measuring the height and contour of a surface, such as a blast furnace burden, using a radiation source and detector wherein the detector has no moving parts.

This invention is particularly advantageous with apparatus wherein remote height and contour measurements are necessary and a hot or dusty atmospheric condition makes it difficult or impossible to use visual means to determine the height and contour of the surface.

In the making of steel, the charge in the blast furnace moves substantially continuously downwardly from a desired level. The rate of downward movement varies substantially. Therefore, the height of the surface of the charge in a blast furnace must be measured in order to determine when and how much material is needed to charge the furnace to a desired level.

Prior methods of measuring the height of a surface have measured only height and have not determined the contour of the surface. The charge in a blast furnace frequently moves downwardly in an uneven manner so that one side of the surface of the charge becomes increasingly higher than the other side, and the resulting uneven contour causes difficulty in evenly forcing a blast of air upwardly through the charge from the bottom of the furnace. This uneven contour may result from what is called "scaffolding." Scaffolding occurs near the top of the bosh of the furnace. This condition is due to irregularities in the working of the furnace and occurs because the zone of fusion is at times suddenly lowered. When this takes place, the pasty mass at the top of the fusion zone tends to adhere to the encircling wall with the result that an incrustation is formed which projects towards the center of the furnace. The mass offers obstruction both to the gases and to the descent of the stock in the area of the incrustation. If this condition is not soon remedied, the blast gases will channel on one side, in which case, series damage to the lining results. A furnace is said to be hanging when the uniform descent of the stock is interrupted because of scaffolding.

An uneven contour is also indicative of the possibility of a slip. Slips are caused by an initial wedging or bridging of the charge in either the upper or lower part of the furnace. When this condition occurs, the charge beneath the wedged portion settles away from that above. The blast pressures rises and the wedged stock ultimately falls abruptly. The sudden release of confinement of the gases produces a result similar to an explosion. Slips have been known that are so violent that the top of the furnace is torn off, and even in slips of lesser violence very serious damage is incurred.

Blast furnaces are large structures and contain hot and dirty gas under pressure making it impossible to obtain visual observation of the surface of the charge. Because of these conditions, remote means for determining the height and contour of the surface of the charge are necessary.

Heretofore, complicated mechanical means utilizing a probe or a weight have been used for remotely measuring the surface height of the material at one or two locations. The use of such mechanical means creates difficulties in the operation of the blast furnace. These difficulties include inadequate sealing of the furnace against leakage, and tilting or damage of the probe or weight.

This invention contemplates apparatus for translating scattered radiation from a surface into an indication of the elevation and contour of the surface. One of its embodiments comprises means for directing radiation from a radioactive source against a specific zone of the surface of a material, whereby the material in that zone scatters the radiation and, from the scattered radiation, the height and contour of the surface of the material can be determined.

The above and further objects and novel features of the invention will appear more fully from the following detailed description when the same is read in connection with the accompanying drawing. It is to be expressly understood, however, that the drawings are not intended as a definition of the invention but are for the purpose of illustration only.

FIGURE 5 is a substantially horizontal cross-sectional view of the detector shown of FIGURE 3 as taken on lines V—V of FIGURE 6.

FIGURE 6 is a vertical cross-sectional view taken on lines VI—VI of FIGURE 5.

Figure 1:
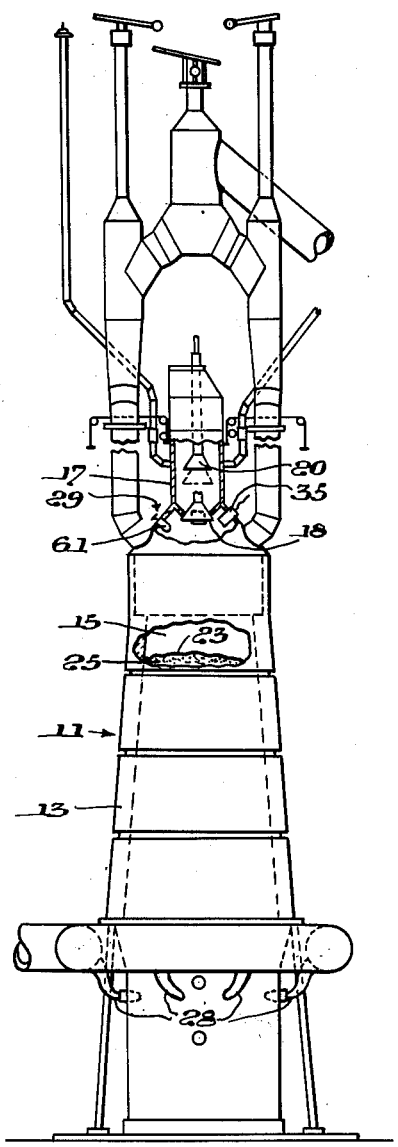
FIGURE 1 is a partial elevational view of a blast furnace incorporating an embodiment of the profilimeter of this invention.
Figure 3:
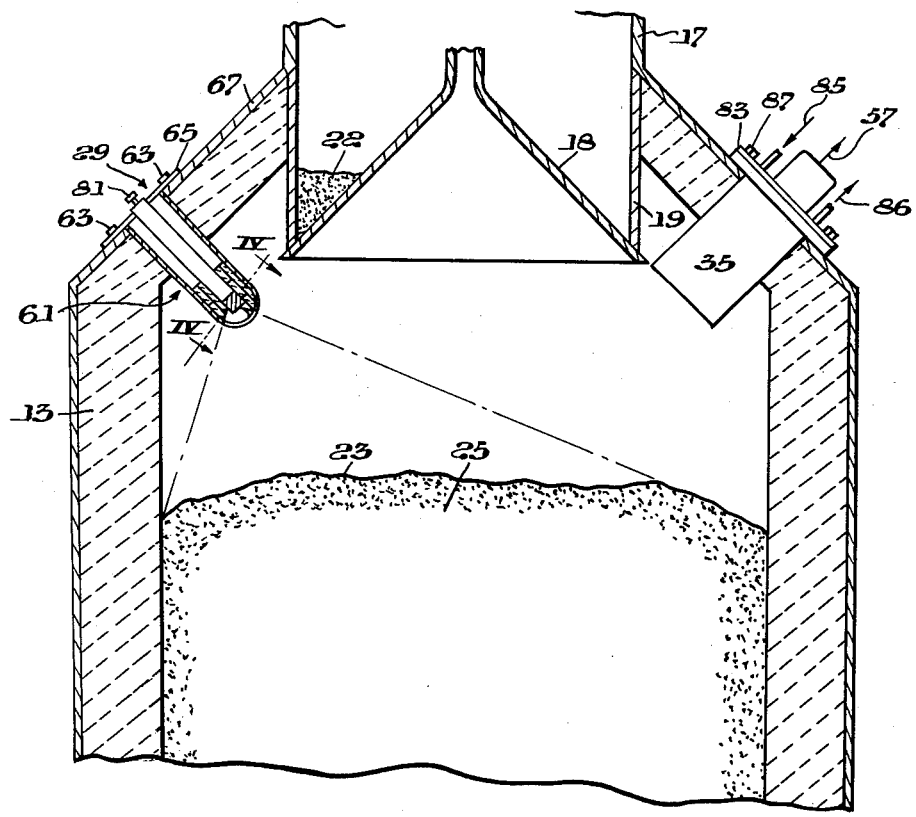
FIGURE 3 is a partial cross-section of FIGURE 1 split at 90° to the center line of FIGURE 1.
Figure 4:
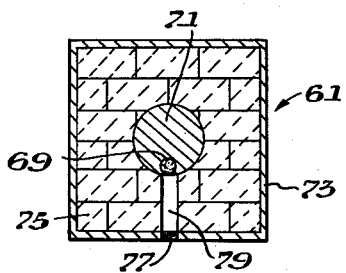
FIGURE 4 is a cross-sectional view taken through lines IV—IV of FIGURE 3.

An embodiment of invention is illustrated in FIGURE 1 as being incorporated in a conventional shaft type blast furnace 11. The wall 13 of the blast furnace 11 forms a chamber 15 which is charged through a bell chamber hopper 17 in a well-known manner. Lower bell 18 (FIGURE 3) of hopper 17 opens and closes against extension 19 of hopper 17 while the upper bell 20 is closed. This permits solid material 22 on the lower bell to be charged into the furnace chamber 15 while maintaining furnace chamber 15 closed. Advantageously, the surface 23 of material 25, commonly referred to as a furnace charge or furnace burden, is charged to a predetermined substantially horizontal plane. When the charge is level on a horizontal plane, the air blast forced into the bottom of chamber 15 through tuyeres 28 flows upwardly through material 25 uniformly. An even flow of air is necessary since it permits the uniform reduction of ore in the charge.

The reduction of the ore and the removal of iron and slag from the bottom of chamber 15 causes the charge to slowly and continuously move downwardly. The rate of downward movement at different positions, however, may be rapid or slow, even or uneven. It is important to be able to determine the height and contour of the surface in the furnace. As discussed above, this determination has been difficult heretofore because of the dusty working conditions above the surface 23 of the furnace burden 25.

To determine the height or contour of the surface of the charge in accordance with this invention, a radiation source and detector are incorporated into the furnace.

The radiation source 29 directs the radiation across a specific zone 36 (FIGURE 2) of the surface 23 of a furnace burden 25. The radiation is directed in a straight line along the diameter of the furnace and the heavy dense material in the furnace charge 25 which is irradiated then scatters this radiation.

A portion of the scattered radiation strikes the detector 35. The response to the scattered radiation is made by the detector 35 which translates this radiation into discernable indications of the height and contour of the surface 23.

The detector 35 includes an array of scintillator light pipe filaments 37 which fan out and collect radiation from all points of the furnace from which radiation could be reflected. Advantageously, there may be an array of light pipes having twenty-four pipes in each direction (vertical and horizontal) wherein one light pipe would be aimed at each one foot interval across the furnace and each half foot interval vertically in the range of measurement. Between the light pipes is a heavy metal shielding 41 to insure that only the light pipe aiming at a given irradiated point on the charge surface has an appreciable probability of detecting radiation from it. The detector 35 is protected by a jacketed wall 58 having a coolant 59 such as water flowing therethrough. The coolant is introduced into the jacket through line 85 and leaves by line 86.

Each light pipe in the detector is a filament drawn from plastic phosphors and functions simultaneously as a scintillating detector and a light pipe. Light is caused by passage of a charged particle through the filament and is piped by internal reflection to the end of the filament. Thus, radiation traversing the array causes a charged particle to be emitted resulting in a flash of light which in turn is piped through the filament to emit light at its end.

The filaments may be prepared by melting polymerized plastic scintillator material, such as polystyrene containing 3% terphenyl and 0.1% POPOP (1,4-di-2-[5 phenyl-oxazole]-benzene), at about 200° C. and then continuously drawing out a filament of about 1 mm. in diameter. The diameter may be varied between 0.5 mm. and 1 mm. by adjusting temperature and speed. A diameter of about 0.7 mm. is preferred.

A photocathode such as image orthicon 43 is positioned at one end of the light pipe array. The light produced in the filaments 37 traverses the filaments and is directed upon a sensitive photoelectric surface, such as photocathode 45 which then emits current. The emitted current 47 from the photocathode carries current-density variations, corresponding to the light-intensity variations in the picture to be viewed. The current field from the photocathode is focused upon a two-sided mosaic target 49 by means of a suitable electron lens. The mosaic elements are charged up according to the density of the exciting current by secondary-electron emission 48. The mosaic is scanned with a low-velocity beam 51, which is deflected by magnetic means. The velocity of the scanning electrons is sufficiently low so that no secondary electrons are created in the scanning process. The relative potentials of the mosaic and beam electrons are adjusted so that the scanning electrons will be attracted to nuetralize the charge of the brightly illuminated areas but will be reflected from the dark areas. The signal is derived from the reflected electrons 53 whose number will be an inverse function of the original picture illuminations. In addition, the reflected electrons are multiplied by an electron multiplier 55, which helps increase the sensitivity and reduce the noise figure of the device. The output signal 57 is then amplified and passed to a visual device such as an oscilloscope or a TV picture tube whereon the height and contour of the surface of the charge may be viewed.

Figure 9:
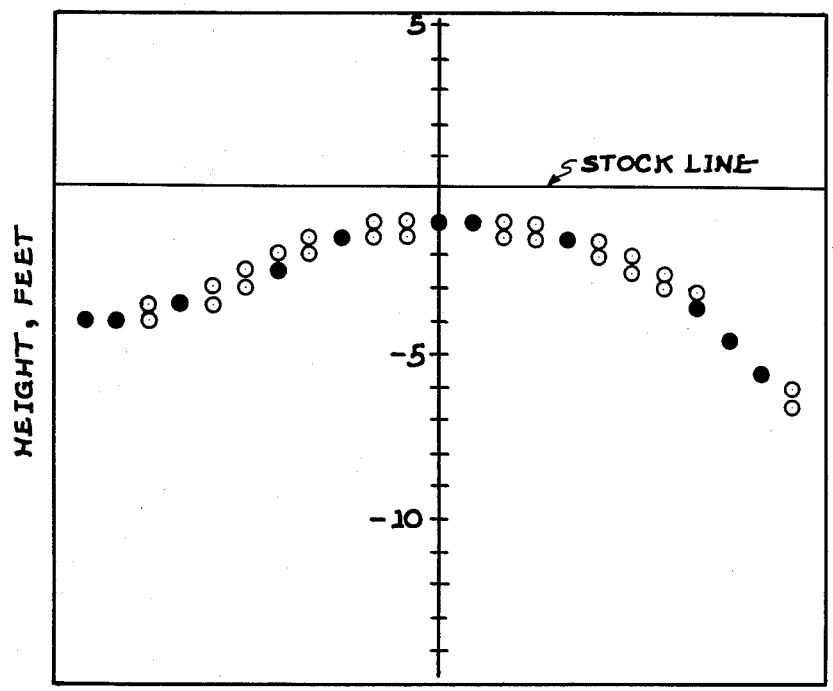
FIGURE 9 shows the surface contour and height of a blast furnace charge as indicated by the embodiment of FIGURE 1.

The picture observed is of the type shown in FIGURE 9. It would appear on an oscilloscope, TV picture tube, or the like and would have stock line, center line, and other features added either electrically or drawn on an overlay. Each illuminated spot indicates a signal received by one of the light pipe scintillators. A line drawn roughly through these spots shows the contour of the charges surface. Depending on the resolution obtained from the source of radiation and shield scintillator combination, the surface may be indicated by either one or two spots, as shown, or it may be that several vertically disposed spots will indicate a single point on the surface. An indication of the height and contour of the charge as shown in FIGURE 9 would be practically instantaneous and any changes would be made known immediately to an operator who could then correct for any surface deviations thus avoiding any major deviations, thereby providing a blast furnace charge which will not slip and which will afford an even flow of air.

The radiation emanates to the furnace from a thimble 61 that is attached to furnace wall 13 of the charge 25 by bolts 63 threaded through flange 65 on thimble 61 and permits the removal from shell 67 around furnace wall 13 when desired.

Radiation source 29 in the thimble 61 advantageously comprises a pallet 69 of radioactive material in a heavy metal plug 71. The radiation material may be a 140 curie cobalt 60 pallet, or other radiation sources may be used, and the heavy metal plug may be tungsten.

Thimble 61 has a shell 73 of heavy gauge material in which are placed steel bricks 75. The thimble serves as a shield so that radiation is emitted only from radiation window 77 arranged over a slot 79 in the brick. Window 77 is thin gauge steel which permits the passage of radiation from pallet 69. Slot 79 serves as a collimator to insure that the radiation leaves the thimble 61 in parallel beams.

Plug 71 is rotatably mounted in the bricks 75 of thimble 61 and may be rotated by handle 81 whereby radiation pallet 69 can be placed in a storage position where the steel bricks 75 and plug 71 substantially completely shield the furnace from the radiation from pallet 69, or the plug 71 can be placed in an operative position to align pallet 69 with collimating slot 79 so as to direct radiation against surface 23 of charge 25 and produce an irradiated zone 36 thereof.

In operation, the dense material within radiation zone 36 scatters any radiation applied to it and a response to the scattered radiation is made by detector 35 which is removable from furnace wall 13 by means of flange 83 and bolts 87 threaded through the flange into the furnace shell 67.

By scintillation of the filaments when struck with the radiation, the radiation is translated into light and the detector 35 thereby translates the radiation into an indication of the height and contour of surface 23. The light emanates from the end of the filaments whereat the light is picked up by a photocathode which translates the light into a flow of electrons. The flow of electrons is directed to a means such as an image orthicon and thereupon the contour of the surface may be visually determined.

Figure 2:
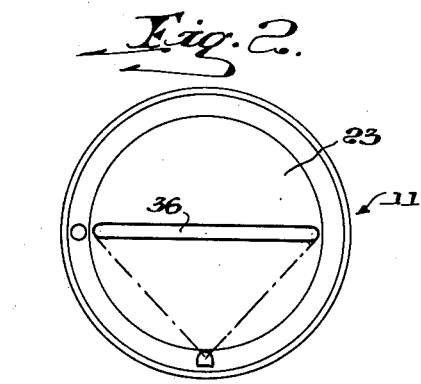
FIGURE 2 is a schematic top view of the arrangement of the radiation source and detector of FIGURE 1.
Figure 7:
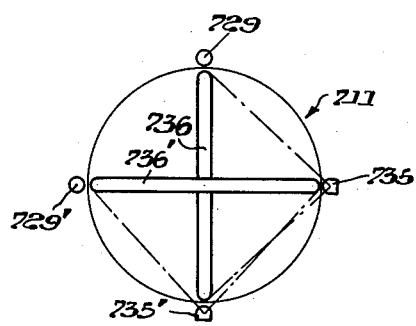
FIGURE 7 is a schematic top view of another embodiment of the invention wherein a plurality of radiation means and profilimeters are used.

In another embodiment of this invention as shown schematically in FIGURE 7, the furnace 711 is provided with two profilimeters 735 and 735' and two radiation sources 729 and 729' similar to those described with reference to FIGURE 2. Such an arrangement gives height and contour indications of zones 736 and 736' of surface 23.

Figure 8:
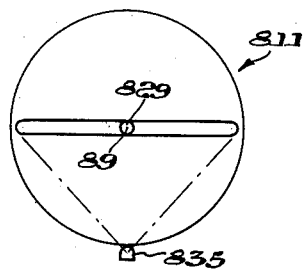
FIGURE 8 is a schematic view of a further embodiment showing an alternate arrangement of the radiation means and profilimeter of FIGURE 1.

In still another embodiment of this invention shown schematically in FIGURE 8, radiation source 829 is located along the axis 89 of furnace 811 and profilimeter 835 is located at the side of furnace 811.

It is also possible to locate the radiation source outside the furnace, and in some instances it would be necessary to use a plurality of radiation sources.

This invention produces a zone of scattered radiation on a surface and directs the ends of scintillator light pipe filaments at the irradiated zone whereby the height and surface contour of the irradiated zone may be translated into remote distance indications of the height and contour of the surface whereby these remote distance indications are shown by the use of a detector having no moving parts.

The foregoing has described preferred embodiments of my invention. It is to be understood that the form of apparatus shown and described and the details of procedure may be varied without departing from the spirit of the invention or the scope of the appended claims.

Having thus described my invention, what I claim is:

1. Means for determining the height and contour of a surface of dense material in a blast furnace comprising a stationary radiation source, means for directing radiation from said source against a surface portion of said material, a stationary radiation detector comprising an array of fanned out light pipe scintillator filaments responsive to the scattered radiation whereby, when individual light pipe scintillator filaments are struck by said scattered radiation, light is emitted which traverses the length of said filaments and thereby visually indicates the height and contour of said surface, each light pipe scintillator filament being directed toward a different portion of said blast furnace whereby each light pipe scintillation filament is responsive to scattered radiation from a different portion of said blast furnace to convert said radiation to light, means to transfer said light from said light pipe scintillator filaments to a means for visually observing the height and contour of said surface of dense material, and heavy metal shielding positioned between said light pipe scintillators to substantially prevent radiation from one portion of said blast furnace from striking scintillator filaments other than the scintillator filament directed at said one portion of said blast furnace.

2. A profilimeter for determining the height and contour of a surface of dense material in a furnace comprising a stationary radiation source, means for directing radiation from said source against a localized surface portion of said dense material for irradiating said surface whereby said dense material scatters the radiation, a stationary radiation detector comprising a fanned out array of light pipe scintillator filaments, each light pipe scintillator filament being directed at one end thereof toward a different portion of said blast furnace whereby each light pipe scintillator filament is response to scattered radiation from a different portion of said blast furnace to convert said scattered radiation to light which traverses the length of said filaments, and said light pipe scintillator filaments terminating at the other end thereof at a photocathode surface of an image orthicon, whereby said light is converted to an electrical signal corresponding to the position and intensity of said light, a visual device for converting said electrical signal to a visual indication of the height and contour of said surface, said light pipe scintillator filaments having heavy metal shielding positioned therebetween, and a cooling water jacket enclosing said stationary radiation detector.

References Cited in the file of this patent

UNITED STATES PATENTS

| | | |
|---|---|---|
| 2,503,770 | Robinson | Apr. 11, 1950 |
| 2,675,478 | Brunton | Apr. 13, 1954 |
| 2,803,161 | Summerhayes | Aug. 20, 1957 |
| 2,828,422 | Steierman | Mar. 25, 1958 |
| 2,830,187 | Scherbatskoy | Apr. 8, 1958 |
| 3,011,057 | Anger | Nov. 28, 1961 |
| 3,048,698 | Carlson | Aug. 7, 1962 |
| 3,049,620 | George | Aug. 14, 1962 |